United States Patent
Sekar et al.

(10) Patent No.: US 12,095,952 B2
(45) Date of Patent: Sep. 17, 2024

(54) METHOD AND SYSTEM FOR OPERATING A BI-DIRECTIONAL AUDIO DEVICE WITH AN EXTERNAL SPEAKER

(71) Applicant: Logitech Europe S.A.

(72) Inventors: Vivek Sekar, San Francisco, CA (US); Beau Chimene, Austin, TX (US)

(73) Assignee: Logitech Europe S.A., Lausanne (CH)

( * ) Notice: Subject to any disclaimer, the term of this patent is extended or adjusted under 35 U.S.C. 154(b) by 531 days.

(21) Appl. No.: 17/386,074

(22) Filed: Jul. 27, 2021

(65) Prior Publication Data
US 2023/0029589 A1 Feb. 2, 2023

(51) Int. Cl.
*H04M 9/08* (2006.01)
*H04R 3/02* (2006.01)
*H04R 3/12* (2006.01)
*H04S 7/00* (2006.01)

(52) U.S. Cl.
CPC ........... *H04M 9/082* (2013.01); *H04R 3/02* (2013.01); *H04R 3/12* (2013.01); *H04R 2203/12* (2013.01); *H04R 2420/05* (2013.01); *H04R 2430/01* (2013.01); *H04R 2499/11* (2013.01); *H04R 2499/15* (2013.01); *H04S 7/305* (2013.01)

(58) Field of Classification Search
CPC ..... H04M 9/082; H04R 3/02; H04R 2203/12; H04R 2499/11; H04R 2499/15; H04R 2430/01; H04R 3/12; H04R 2420/05; H04S 7/305

See application file for complete search history.

(56) References Cited

U.S. PATENT DOCUMENTS

| | | | | |
|---|---|---|---|---|
| 6,310,646 B1* | 10/2001 | Shi | ........................ | H04B 17/23 348/192 |
| 6,707,821 B1* | 3/2004 | Shaffer | ............... | H04L 47/2416 370/347 |
| 9,722,544 B2* | 8/2017 | Olson | ........................ | H03F 3/68 |
| 11,432,070 B2* | 8/2022 | Chun | ................... | H04R 1/1025 |
| 11,523,209 B1* | 12/2022 | Ding | ................... | H04R 1/1091 |
| 11,765,114 B2* | 9/2023 | Jon | ........................ | H04L 51/10 709/206 |
| 11,917,378 B2* | 2/2024 | Heineman | ............. | H03F 1/0227 |
| 2003/0045283 A1* | 3/2003 | Hagedoorn | .......... | H04R 25/558 455/557 |
| 2005/0026560 A1* | 2/2005 | Villaverde | .......... | H04M 1/6091 455/3.06 |

(Continued)

*Primary Examiner* — Lisa Hashem
(74) *Attorney, Agent, or Firm* — Kilpatrick Townsend & Stockton LLP

(57) ABSTRACT

In some examples, an apparatus comprises: a housing; an internal speaker housed within the housing; an internal microphone housed within the housing; an interface; and a controller configured to: receive, using the internal microphone, ingress audio signals; output, using the internal speaker, first egress audio signals at a first power level when the internal microphone receives the ingress audio signals; detect that an external speaker is connected to the interface; based on detecting that the external speaker is connected to the interface, disable the internal microphone; and output, using the external speaker, second egress audio signals when the internal microphone receives the ingress audio signals, the second egress audio signals being output at a second power level higher than the first power level.

20 Claims, 17 Drawing Sheets

(56) References Cited

U.S. PATENT DOCUMENTS

| | | | |
|---|---|---|---|
| 2007/0178860 A1* | 8/2007 | Sutardja | H03F 1/025 455/127.4 |
| 2014/0064506 A1* | 3/2014 | Ryu | H04R 3/02 381/66 |
| 2022/0208208 A1* | 6/2022 | Heo | G10L 21/0232 |

* cited by examiner

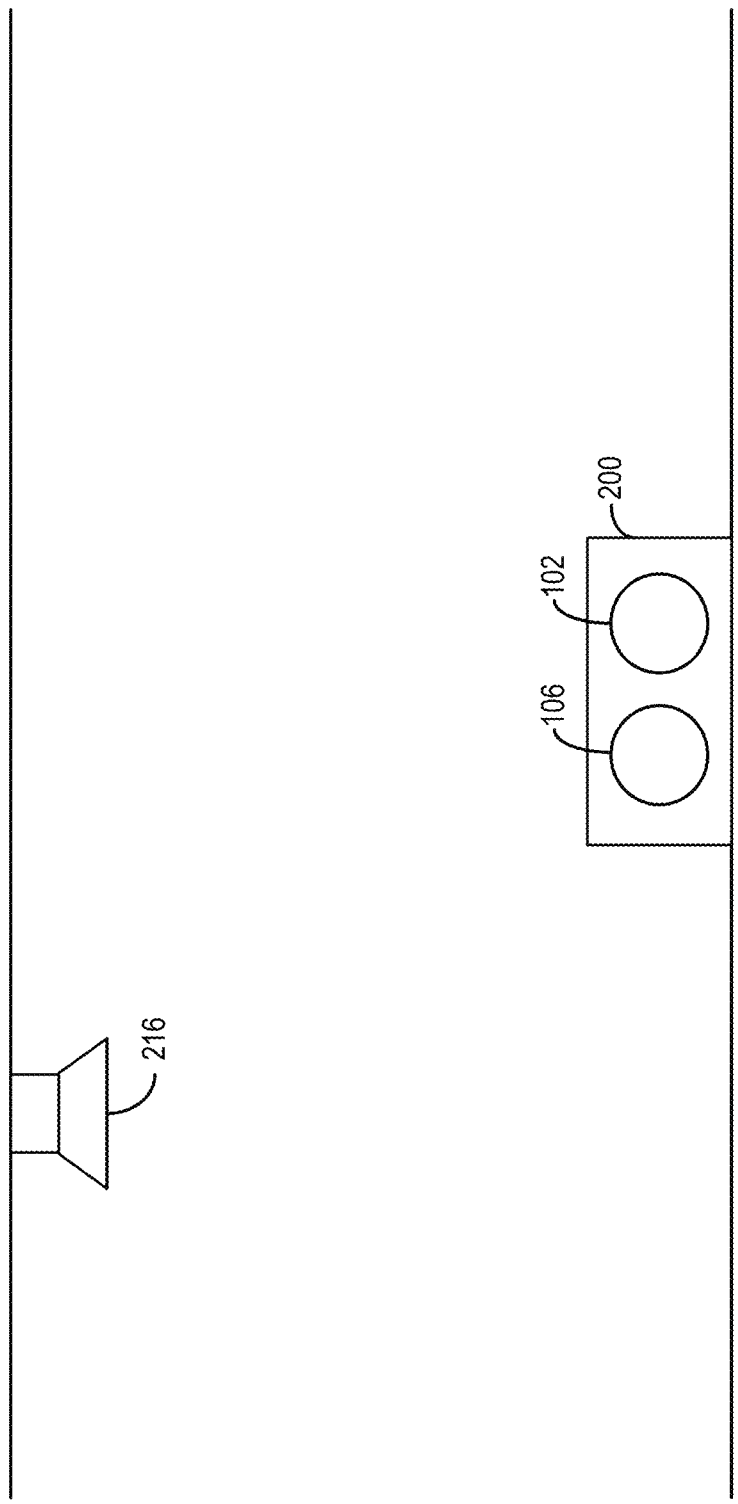

METHOD AND SYSTEM FOR OPERATING A BI-DIRECTIONAL AUDIO DEVICE WITH AN EXTERNAL SPEAKER

BACKGROUND

An audio device, such as a bi-directional audio device, can include an internal microphone and an internal speaker embedded in the device, to support bi-directional audio traffic. The microphone can receive ingress audio signals from a first user, whereas the speaker can output egress audio signals to the first user. The bi-directional audio device can be connected to a second device, such as a phone, a computer, etc., over a network, to support a bi-directional audio communication session between the first user and a second user of the second device. For example, the bi-directional audio device can transmit the ingress audio signals received from the first user to the second user, and output the egress audio signals received from the second user to the first user. Examples of a bi-directional audio device can include, for example, a computer, a video conferencing system, a wearable headset, etc.

One key performance metric of the bi-directional audio device is the quality of sound detected by the microphone, which can affect the quality of speech audio signals of the first user perceived by the second user. The quality of sound detected by the microphone can be affected by various factors, such as the effect of echo. Specifically, the audio signals output by the speaker of the bi-directional audio device, which can carry the speech of the second user, may be detected by the device's microphone, and the sound is transmitted back to the second device. As a result, the second user may receive, in addition to the speech of the first user, the second user's own speech, thereby creating the effect of echo. The effect of echo should be suppressed, to enable each user of an audio communication session to listen to the other user's speech with high clarity and high fidelity.

BRIEF SUMMARY

In some examples, an apparatus comprises: a housing; an internal speaker housed within the housing; an internal microphone housed within the housing; an interface; and a controller configured to: receive, using the internal microphone, ingress audio signals; output, using the internal speaker, first egress audio signals at a first power level when the internal microphone receives the ingress audio signals; detect that an external speaker is connected to the interface; based on detecting that the external speaker is connected to the interface, disable the internal microphone; and output, using the external speaker, second egress audio signals when internal microphone receives the ingress audio signals, the second egress audio signals being output at a second power level higher than the first power level.

In some aspects, the external speaker is positioned at least one foot away from the apparatus.

In some aspects, the second power level is determined based on a model of the external speaker.

In some aspects, the apparatus further comprises a memory that stores a set of external speaker models and properties of each external speaker model. The controller is configured to: determine a model of the external speaker; retrieve, from the memory, the properties of the external speaker based on the model; and determine the second power level based on the retrieved properties.

In some aspects, the retrieved properties include an electrical property of the external speaker.

In some aspects, the retrieved properties include a beamforming property of the external speaker.

In some aspects, the controller is configured to: determine a distance between the apparatus and the external speaker; and determine the second power level based on the distance and the retrieved properties.

In some aspects, the controller is configured to: determine a relative location of the apparatus with respect to the external speaker; and determine the second power level based on the relative location and the retrieved properties.

In some aspects, the controller is configured to: obtain one or more images of an operation environment in which the apparatus and the external speaker are located; determine an operation condition based on the one or more images; and determine the second power level based on the operation condition.

In some aspects, the operation condition includes a relative location of a user of the apparatus with respect to the apparatus.

In some aspects, the operation condition indicates a reflectivity of audio signals in the operation environment.

In some aspects, the controller is configured to determine the second power level based on a default setting.

In some aspects, the controller is configured to determine the second power level based on the default setting based on determining that the properties of the external speaker are not stored in the memory.

In some aspects, the controller is configured to: perform a calibration operation to measure echo signal power at an output of the internal microphone when the external speaker outputs the second egress audio signals at the second power level; and adjust the second power level based on a result of the calibration operation.

In some aspects, the measurement of the echo signal power is based on feedback from a user.

In some examples, a method comprises: receiving, using an internal microphone of a bi-directional audio device, ingress audio signals; outputting, using an internal speaker of the bi-directional audio device, first egress audio signals at a first power level when the internal microphone receives the ingress audio signals; detecting that an external speaker is connected to an interface of the bi-directional audio device; based on detecting that the external speaker is connected to the interface, disabling the internal microphone; and outputting, using the external speaker, second egress audio signals when the internal microphone receives the ingress audio signals, the second egress audio signals being output at a second power level higher than the first power level.

In some aspects, the external speaker is positioned at least one foot away from the bi-directional audio device. The second power level is determined based on a model of the external speaker.

In some aspects, the second power level is determined based on an operation condition of the external speaker.

In some aspects, the second power level is determined based on a calibration operation.

BRIEF DESCRIPTION OF THE DRAWINGS

The detailed description is set forth with reference to the accompanying figures.

FIG. 5A, FIG. 5B, FIG. 5C, and FIG. 5D illustrate example techniques employed by the bi-directional audio device of FIG. 2A-FIG. 2C in controlling the output power of an external speaker, according to some embodiments.

DETAILED DESCRIPTION

Figure 1A:
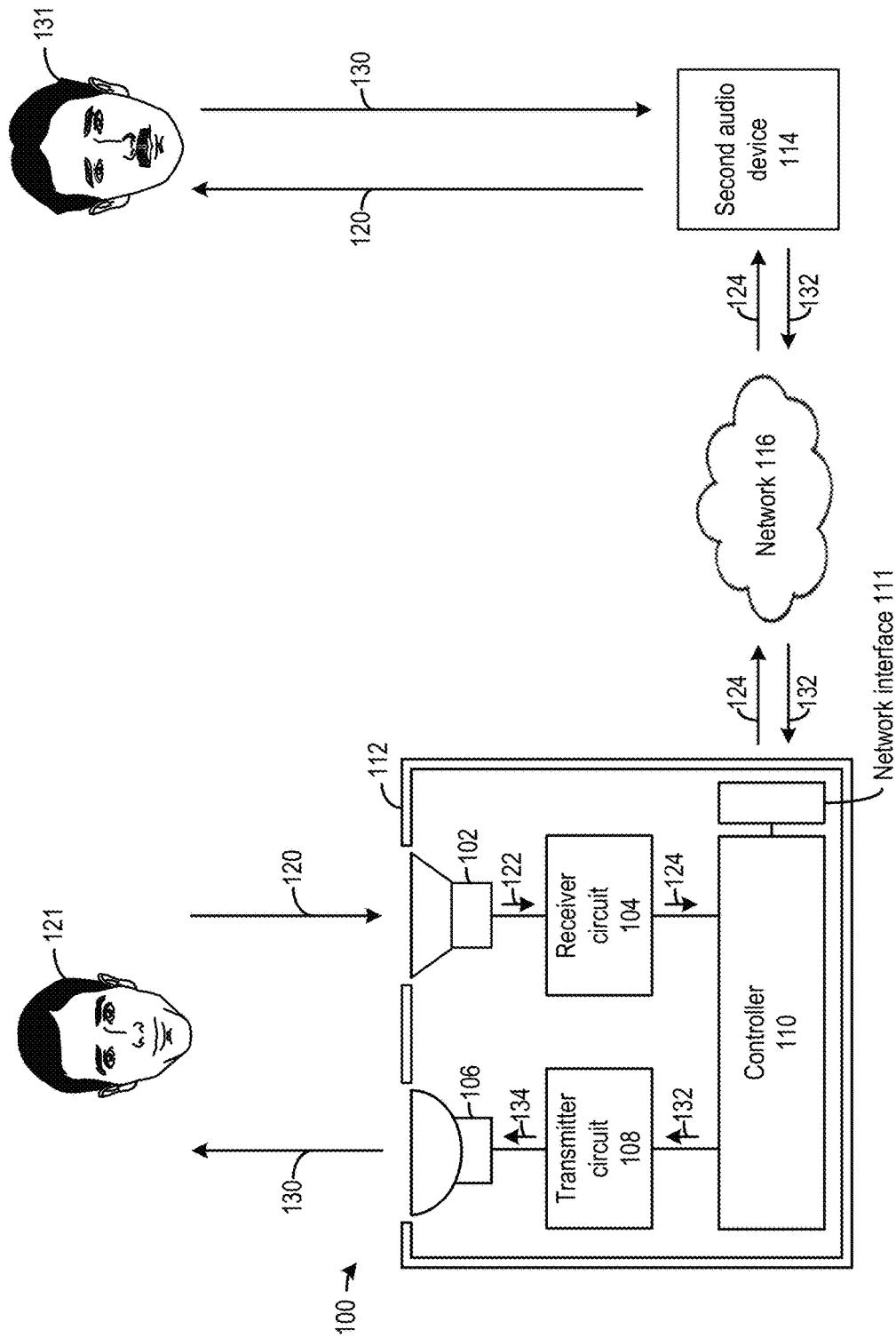
FIG. 1A, FIG. 1B, and FIG. 1C illustrate examples of a bi-directional audio device and its operations.

Aspects of the present disclosure relate generally to an audio device, and in particular, operating an internal speaker of an audio device that is connected with an external speaker.

In the following description, various examples of an audio device having an internal speaker and having the capability of operating an external speaker will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

As described above, a bi-directional audio device can include an internal microphone and an internal speaker embedded in the device, to support bi-directional audio traffic. The bi-directional audio device can be connected to a second device, such as a phone, a computer, etc., over a network, to support a bi-directional audio communication session between a first user of the bi-directional audio device and a second user of the second device. The bi-directional audio device can transmit the ingress audio signals received from the first user to the second user, and output the egress audio signals received from the second user to the first user. Examples of bi-directional audio device can include or can be part of, for example, a computer, a video conferencing system, a wearable headset, etc.

The quality of the audio communication session supported by the bi-directional audio device, however, can be degraded by echo. Specifically, the audio signals output by the speaker of the bi-directional audio device, which can carry the speech of the second user, may be detected by the device's microphone and transmitted back to the second device. As a result, the second user may receive, in addition to the speech of the first user, the second user's own speech, thereby creating the effect of echo. The echo effect can reduce the clarity and fidelity of the first user's speech as received by the second user, and degrade the quality of the bi-directional audio communication between the first user and the second user.

There are various ways by which audio signals can propagate from the speaker to the microphone within the same audio device to become echo signals. One way is by coupling of mechanical vibrations through the housing of the audio device. Specifically, the speaker outputs the sound, including the second user's speech, through vibrating the diaphragm of the speaker. While the audio device may include structures to mechanically insulate the speaker diaphragm from the microphone and from the housing, if the speaker outputs the sound at a sufficiently high power level, the vibrations of the speaker diaphragm can become large enough to couple into the microphone via the insulation and the housing. As another example, the audio signals output by the speaker can be reflected and reach the microphone. If the reflected sound has a high power level, it may distort or even saturate the output of the microphone.

One way to reduce the echo effect is by performing an echo cancellation operation, in which the speech signals of the second user can be subtracted from the outputs of the microphone to remove the echo signals component. Such arrangements, however, may require the echo signals component of the microphone output to be linearly related to the speech signals of the second user for the cancellation operation to be effective. But when the echo signals are created by coupling of mechanical vibrations, or when the echo signals are part of saturated/distorted microphone outputs caused by high-power reflected speaker output, the echo signals component of the microphone output is typically not linearly related to the speech signals of the second user. As a result, an echo cancellation operation is typically ineffective in reducing the echo signals created by mechanical vibrations and/or echo signals in saturated/distorted microphone outputs.

Another way to reduce the echo effect is by reducing the speaker volume and the speaker output signal power, which in turn can reduce the coupling of mechanical vibrations and saturation/distortion of microphone outputs. Such arrangements, however, may make it difficult for the first user to hear the audio signals output by the speaker, especially in a case where the first user is located far away from the speaker (e.g., when the audio device operates in an outdoor environment and/or in a large room), which can degrade user experience.

Conceptual Overview of Certain Embodiments

Examples of the present disclosure relate to methods and systems for operating a bi-directional audio device that is capable of connecting with an external speaker. The bi-directional audio device includes a housing, an internal speaker housed within the housing, an internal microphone housed within the housing, and an interface. The bi-directional audio device further comprises a controller. The internal speaker can be controlled by the controller to output first egress audio signals at a first power level. The internal microphone can detect first ingress audio signals while the internal speaker outputs the first egress audio signals. The controller can also detect that an external speaker is connected to the interface. Based on the detection, the controller can disable the internal speaker, and control the external speaker to output second egress audio signals at a second power level higher than the first power level. The internal microphone can detect second ingress audio signals while the external speaker outputs the second egress audio signals.

Specifically, the bi-directional audio device can be connected to a second device over a network, and switch from using the internal speaker to using the external speaker during a bi-direction audio communication session or between different sessions, to output the egress audio signals received from the second device via the network. The first power level of the first egress audio signals output by the internal speaker can be set such that the power level of the echo signals component in the outputs of the internal microphone, caused by coupling of mechanical vibrations of the internal speaker, reflection of the first egress audio signals, etc., is below an echo signal power threshold, to maintain a quality of the bi-direction audio communication session. The external speaker can be placed away from the housing of the bi-directional audio device by a certain distance (e.g., one foot or more). Due to the increased separation between the external speaker and the internal microphone, the output power level of the external speaker can be increased to the second power level, while the power level of the echo signals component in the outputs of the internal microphone, caused by coupling of mechanical vibrations of the external speaker, reflection of the second egress audio signals, etc., remains below the threshold.

The controller can determine the second power level, and control the external speaker to output the second egress audio signals at the second power level, based on various techniques. For example, the controller can determine the second power level by increasing the first power level by a default amount (e.g., 6 dB). The default amount of increase in the power level can be based on, for example, an assumption that the external speaker is separated from the bi-directional audio device by at least a certain distance (e.g., one foot). The bi-directional audio device may also include a memory to store information of properties of different models of external speakers. The properties can indicate, for example, a signal power ratio between the control signal and the output power of the external speaker. In some examples, the properties may also indicate the external speaker has beamforming capabilities to steer an audio beam at a particular beam direction, which may reduce the power of the reflected second egress audio signals and allow the controller to further increase the second power level. The controller can determine the model of the external speaker connected to the interface, retrieve the properties (e.g., signal power ratio, beamforming properties, etc.) of the model, determine the control signal based on the properties, and transmit the control signal to the external speaker via the interface.

In some examples, the controller may detect a model of an external speaker of which the properties information is not stored in the memory. In such a case, the controller can determine the second power level in a calibration operation. In a first stage of the calibration operation, the controller can increase the first power level by a default amount to the initial second power level. In a second stage of the calibration, the controller can obtain information about the echo signals component of the microphone outputs, and increase or decrease the second power level. The information about the echo signals can be obtained from, for example, the second user's feedback about the echo. Specifically, the bi-directional audio device may support a video conferencing application that allows the second user to send a feedback to the first user about the echo perceived from the microphone outputs of the bi-directional audio device. The feedback can be sent over the network to the first user, or to the video conferencing application. The volume of the external speaker can then be adjusted manually by the first user and/or automatically by video conferencing application.

As another example, the information about the echo signals can be obtained based on a measurement of the power level of the echo signals component in the microphone outputs by the controller. Specifically, the controller can identify the echo signal components in the microphone outputs based on identifying spectral components of the microphone outputs that experience power increases as a result of increasing the output power level of the speaker, and determine the signal power of those spectral components. The controller can then further increase the second power level if the power level of the echo signals remains below the echo signal power threshold, and increase the power level if the power level of the echo signals exceeds the echo signal power threshold. The controller may continuously monitor the power level of the echo signals and adjust the second power level during a bi-directional audio session, such as during a video conferencing session.

In some examples, the power level of the external speaker can also be determined based on an operation condition of the external speaker. The operation condition may include, for example, the actual distance between the external speaker and the bi-directional audio device, the relative location of the external speaker with respect to the bi-directional audio device, the reflective property of various structures in the operating environment of the bi-directional audio device, etc. The operation condition can be determined based on, for example, user input, on ranging operations, and/or from images of the operation environment.

With the disclosed techniques, a bi-directional audio device having an internal microphone and an internal speaker can initially operate the internal speaker to output egress audio signals at a low power level to reduce the echo signals component in the internal microphone output. The bi-directional audio device is also capable of connecting with an external speaker. The bi-directional audio device can use the external speaker to output the egress audio signals instead of using the internal speaker and, as the echo effect created by the external speaker is likely to be less than that of the internal speaker, automatically increase the power level of the external speaker. The bi-directional audio device can also provide more precise control of the power level of the external speaker based on, for example, the properties of the external speaker, the actual relative location between the external speaker and the bi-directional audio device, and the operating condition/environment of the external speaker, etc. All these can maintain the power level of the echo signals component at a low level to improve the clarity of the ingress audio signals as received by the second user of the connected device, while increasing the output power level of the external speaker to improve the clarity of the egress audio signals as received by the first user of the bi-directional audio device, which can improve the quality of the bi-directional audio communication as well as user experience.

Examples of Bi-directional Audio Device and Operations

Figure 1B:
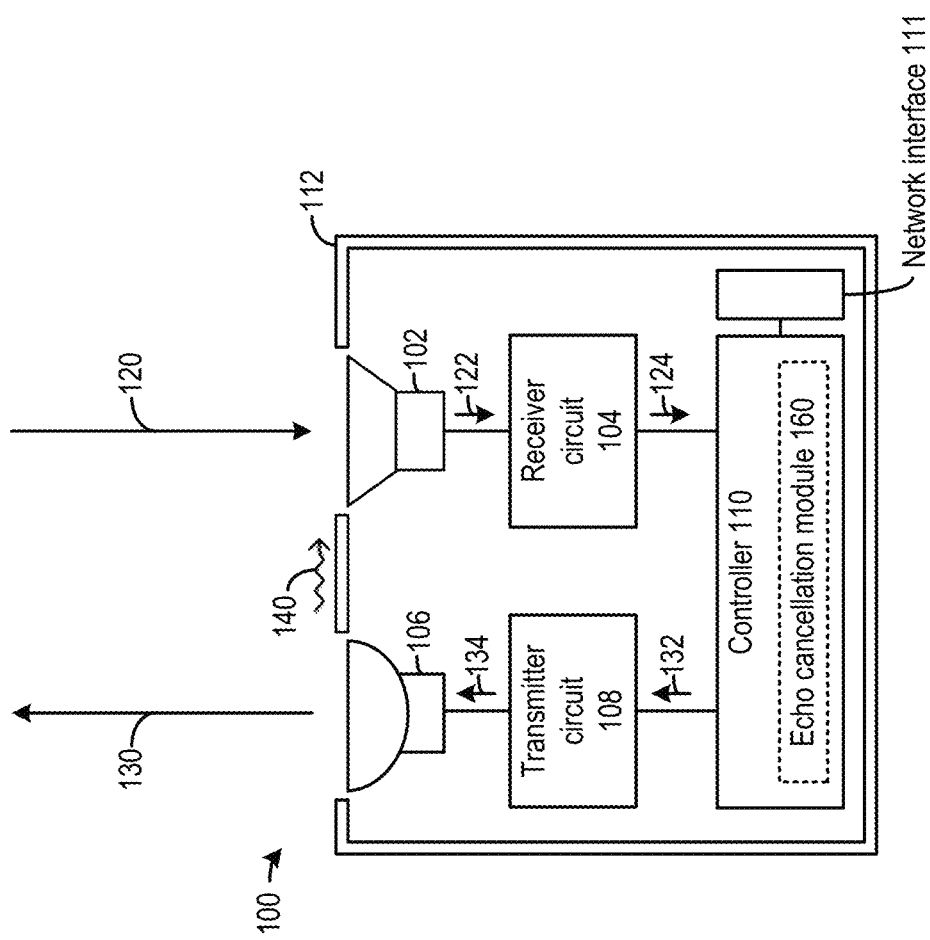
Figure 1C:
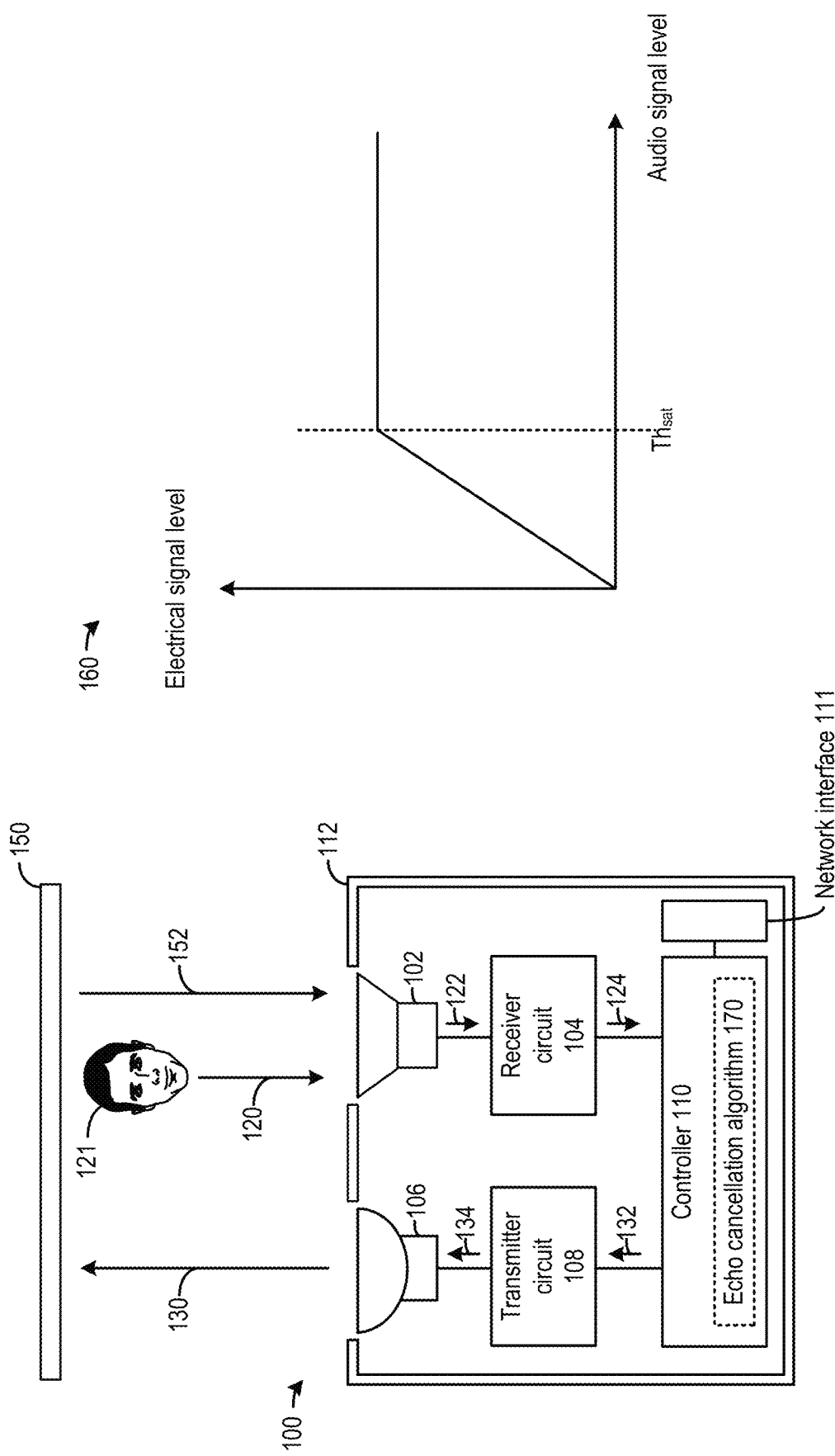

FIG. 1A, FIG. 1B, and FIG. 1C illustrate examples of a bi-directional audio device 100 and its operations. As shown in FIG. 1A, a first bi-direction audio device 100 ("first audio device 100") includes a microphone 102, a receiver circuit 104, a speaker 106, a transmitter circuit 108, a controller 110, and a network interface 111 housed within a housing 112. Network interface 111 can be connected to a network 116, which can be a computer network, a direct wired/wireless link, etc. A second bi-direction audio device 114 (herein after, "second audio device 114") can also be connected to network 116. Second audio device 114 can have similar components (e.g., a microphone, a speaker, a receiver circuit, a transmitter circuit, and a controller) as first audio device 100. First audio device 100 and second audio device 114 can include or can be part of, for example, a computer, a video conferencing system, a wearable headset, etc.

First audio device 100 and second audio device 114 can support a bi-directional audio communication session. Specifically, microphone 102 can receive audio signals 120 (e.g., speech signals) from a first user 121, and convert ingress audio signals to electrical signals 122. Receiver circuit 104 can include processing circuits, such as analog-to-digital converter (ADC) circuits, to convert electrical signals 122 to digital signals 124, and transmit digital signals 124 to controller 110. Controller 110 can perform processing of digital signals 124 (e.g., filtering, noise cancellation, etc.), and transmit processed digital signals 124 to second audio device 114 over network 116. Second audio device 114 can then output audio signals 120 based on digital signals 124.

Moreover, second audio device 114 can receive audio signals 130 (e.g., speech signals) from a second user 131, generate digital signals 132 from audio signals 130 and transmit digital signals 132 over network 116 to first audio device 100. Controller 110 can perform processing of digital signals 132 (e.g., filtering, noise cancellation, etc.), and transmit processed digital signals 132 to transmitter circuit 108. Transmitter circuit 108 can include processing circuits, such as digital-to-analog converter (DAC) circuits, to convert digital signals 132 to electrical signals 134, and transmit electrical signals 134 to speaker 106, which can convert electrical signals 134 to audio signals 130. For first audio device 100, audio signals 120 can be ingress audio signals received by microphone 102 as inputs, whereas audio signals 130 can be egress audio signals output by speaker 106 as outputs. Moreover, for second audio device 114, audio signals 120 can be egress audio signals, whereas audio signals 130 can be ingress audio signals.

The quality of the audio communication session supported by first audio device 100 and second audio device 114, however, can be degraded by echo. Specifically, audio signals 130 output by speaker 106 of first audio device 100, which can carry the speech of second user 131 received from second audio device 114 as part of digital signals 132, may be detected by microphone 102 of first audio device 100, and included as part of the digital signals 124 transmitted back to second device 114. As a result, second user 131 may receive, in addition to the speech of first user 121, the speech of second user 131, or other audio signals derived from the speech of second user 131, thereby creating the effect of echo. The echo effect can reduce the clarity and fidelity of the first user's speech as received by second user 131, and degrade the quality of the bi-directional audio communication between first user 121 and second user 131.

FIG. 1B and FIG. 1C illustrate examples of ways by which audio signals 130 can propagate from speaker 106 to microphone 102. Referring to FIG. 1B, speaker 106 outputs audio signals 130 through vibrating the diaphragm of the speaker. Mechanical vibrations 140 from speaker 106 can couple via housing 112 to microphone 102. While first audio device 100 may include structures to mechanically insulate the speaker diaphragm from microphone 102 and from housing 112, if speaker 106 outputs audio signals 130 at a sufficiently high power level, the vibrations of the speaker diaphragm can become large enough to couple into microphone 102 via the insulation and the housing.

Microphone 102 can convert mechanical vibration 140 into electrical signals 122, and controller 110 can transmit digital signals 124 including data generated from mechanical vibrations 140 to second audio device 114. As mechanical vibrations 140 are derived from audio signals 130, the amplitudes and frequencies of mechanical vibrations 140 track those of audio signals 130. As a result, the mechanical vibrations, when converted into audio signals by second audio device 114, may be perceived as echo signals by second user 131.

FIG. 1C illustrates another example of propagation of audio signals 130 from speaker 106 to microphone 102. As shown on the left of FIG. 1C, audio signals 130 output by speaker 106 can be reflected by a structure 150 (e.g., a wall) to become audio signals 152, which can be detected by microphone 102 and included in electrical signals 122. Referring to chart 160 on the right, if audio signals 130 have a very signal level and/or structure 150 is very close to first audio device 100 such that the signal level of reflected audio signals 152 is close to a saturation threshold $Th_{sat}$, audio signals 152 may appear as saturated or distorted audio signals at the output of microphone 102.

In the examples of FIG. 1B and FIG. 1C, controller 110 may execute an echo cancellation module 170 to perform an echo cancellation operation, which can remove echo signals components from digital signals 124 received from receiver circuit 104 (and microphone 102). But the echo cancellation operation may be ineffective in removing the echo signals components generated in FIG. 1B and FIG. 1C. Specifically, the removal of echo signals components can be based on, for example, subtracting speech signals of second user 131 from digital signals 124. The subtraction operation can be effective in removing the echo signals components if the echo signals components are linearly related to the speech signals where the echo signals components have the same amplitude envelope and spectral components as the speech signals. But mechanical vibrations 140 in FIG. 1B and the saturated/distorted audio signals at the output of microphone 102 in FIG. 1C are not linearly related to the speech signals, and cannot be effectively removed by subtracting the speech signals. As a result, substantial echo signals components may still be present in the digital signals transmitted by controller 110 to second audio device 114 and perceived by second user 131.

Examples of a Bi-directional Audio Device Operating with an External Speaker

Figure 2A:
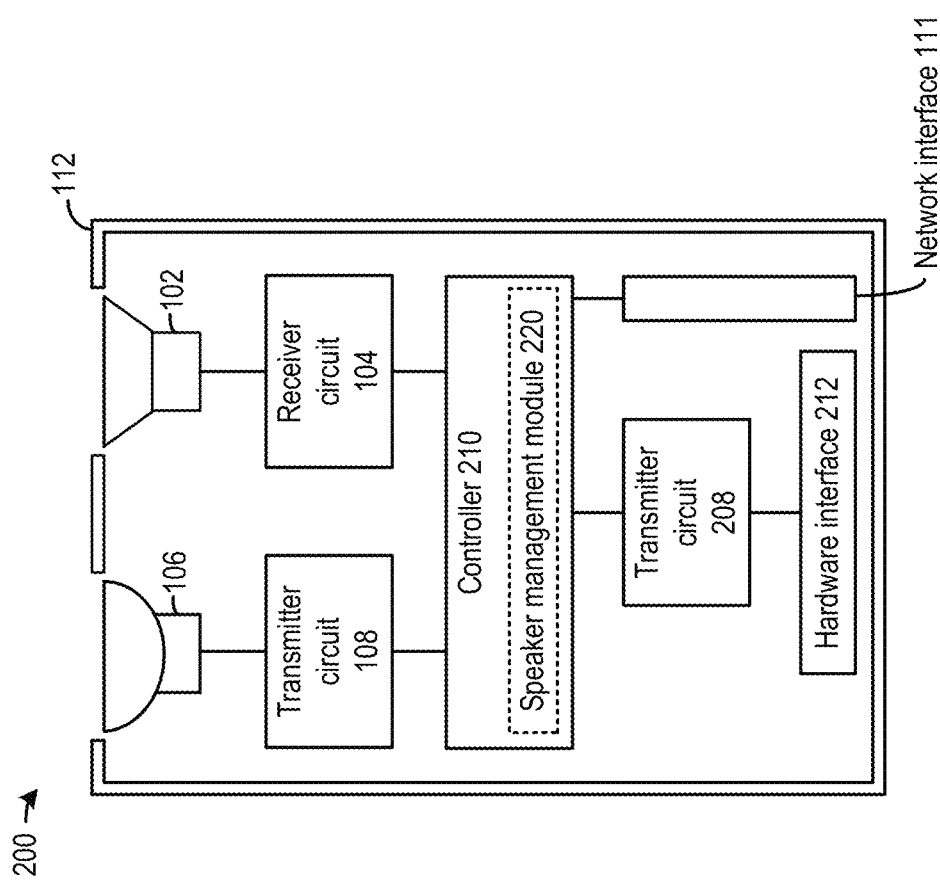
FIG. 2A, FIG. 2B, and FIG. 2C illustrate examples of operating a bi-directional audio device with an external speaker, according to some embodiments.
Figure 2B:
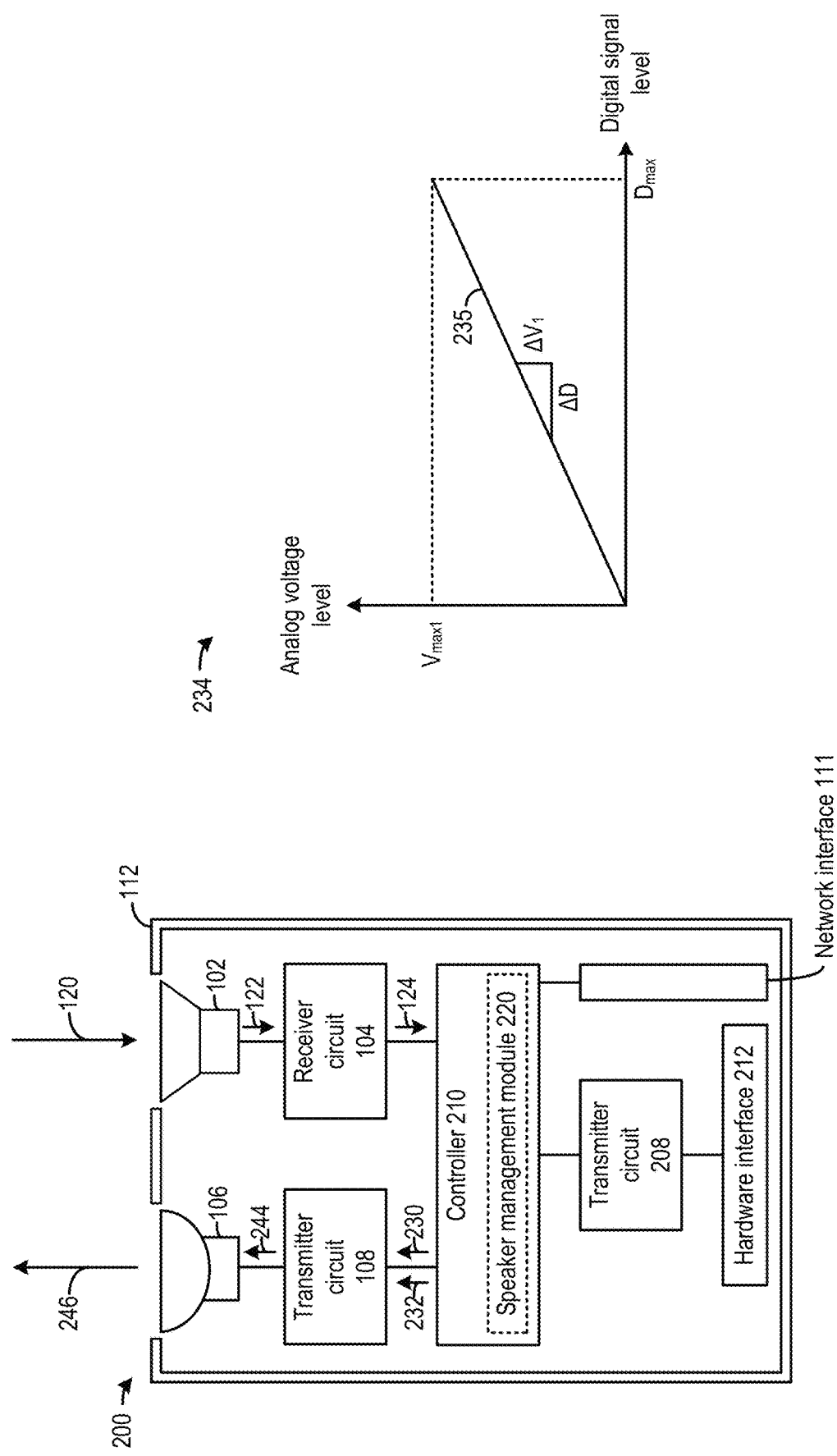
Figure 2C:
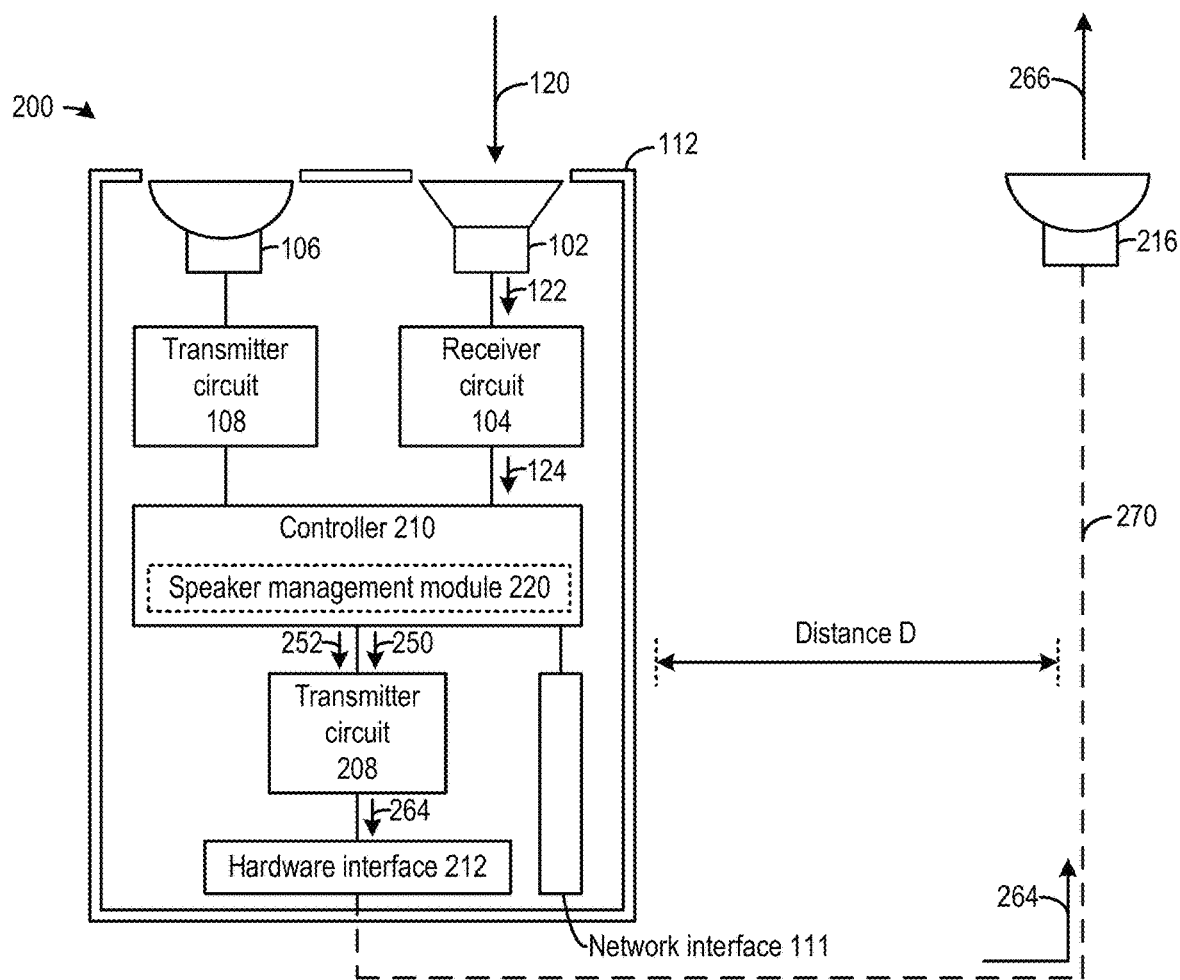
Figure 2C:
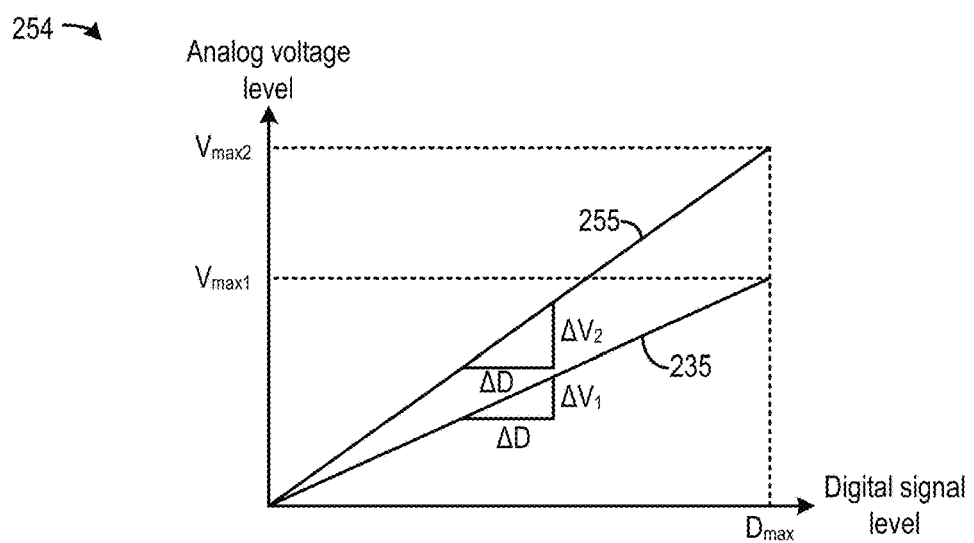

FIG. 2A, FIG. 2B, and FIG. 2C illustrate examples of a bi-direction audio device 200, and their operations, that can address at least some of the issues described above. As shown in FIG. 2, bi-directional audio device 200 can include microphone 102, receiver circuit 104, speaker 106, transmitter circuit 108, a controller 210, a transmitter circuit 208, a hardware interface 212, and network interface 111 within housing 112. Network interface 111 can be connected to second audio device 114 via network 116 (both not shown in FIG. 2A-FIG. 2C), to support a bi-directional audio communication session, as described above. In addition, transmitter circuit 208 is connected to hardware interface 212, which can include, for example, an audio jack, a wired/wireless network interface, etc., that is capable of connecting (via a wired/wireless connection) to an external speaker, such as external speaker 216 in FIG. 2C. Referring to FIG. 2C, external speaker 216 can be placed at a certain distance D (e.g., one foot or above) from bi-direction audio device 200. Controller 210 can also execute a speaker management module 220 to manage the operations of internal speaker 106 and external speaker 216.

FIG. 2B and FIG. 2C illustrate example operations of bi-direction audio device 200. FIG. 2B illustrates an operation of bi-direction audio device 200 when no external speaker is connected to hardware interface 212. Referring to FIG. 2B, controller 210, when executing speaker management module 220, can transmit digital signals 230 representing the audio signals to be output (e.g., received from second audio device 114), together with an audio signal level setting 232, to transmitter circuit 108. Audio signal level setting 232 can indicate a relationship between a digital signal level indicated in digital signals 230, and the level of analog voltage output by transmitter circuit 108.

Chart 234 on the right of FIG. 2B illustrates an example of a relationship between a digital signal level indicated in digital signals 230, and the level of analog voltage output by transmitter circuit 108. Referring to chart 234, a graph 235 can represent a relationship between a digital signal level indicated in digital signals 230, and the level of analog voltage output by transmitter circuit 108, where a maximum voltage $V_{max1}$ is output for a maximum digital signal level $D_{max}$. The relationship between the analog voltage level and the digital signal level can be represented by a gradient $\Delta V_1/\Delta D$ or $V_{max1}/D_{max}$ which can be indicated in audio signal level setting 232.

Based on digital signals 230 and audio signal level setting 232, transmitter circuit 108 can generate electrical signals 244, and drive speaker 106 with electrical signals 244 to output egress audio signals 246. Moreover, while speaker 106 outputs egress audio signals 246, microphone 102 can receive ingress audio signals 120 and convert to electrical signals 122, which are then digitized by receiver circuit 104 into digital signals 124. Speaker management module 220 can select audio signal level setting 232 such that the echo signals components present in electrical signals 122/digital signals 124 generated by microphone 102 and receiver circuit 104, when speaker 106 outputs the maximum audio signal power when driven by the maximum voltage $V_{max1}$ output by transmitter circuit 108, are below an echo signal power threshold to maintain a quality of the bi-direction audio communication session.

FIG. 2C illustrates an operation of bi-direction audio device 200 when external speaker 216 is connected to hardware interface 212. Referring to FIG. 2C, controller 210, when executing speaker management module 220, can disable speaker 106 by not transmitting digitals signals to transmit circuit 108 upon detecting that external speaker 216 is connected to hardware interface 212. Controller 210 can transmit digital signals 250 representing the audio signals to be output (e.g., received from second audio device 114), together with an audio signal level setting 252, to transmitter circuit 208. Audio signal level setting 252 can indicate a relationship between a digital signal level indicated in digital signals 230, and the level of analog voltage output by transmitter circuit 208. Audio signal level setting 252 can configure transmitter circuit 208 and external speaker 216 to output the audio signals at a higher power level than speaker 206 for the same digital signals 230.

Chart 254 on the bottom of FIG. 2C illustrates an example of a relationship between digital signal levels indicated in digital signals 230, and the levels of analog voltage output by transmitter circuits 108 and 208. Referring to chart 254, graph 235, which is identical to as shown in FIG. 2B, can represent the relationship between a digital signal level indicated in digital signals 230, and the level of analog voltage output by transmitter circuit 108, where maximum voltage $V_{max1}$ is output for maximum digital signal level $D_{max}$, and the relationship between the analog voltage level and the digital signal level can be represented by a gradient $\Delta V_1/\Delta D$ or $V_{max1}/D_{max}$. In addition, graph 255 can represent the relationship between a digital signal level indicated in digital signals 230, and the level of analog voltage output by transmitter circuit 208, where maximum voltage $V_{max2}$ is output for maximum digital signal level $D_{max}$, and the relationship between the analog voltage level and the digital signal level can be represented by a gradient $\Delta V_2/\Delta D$ or $V_{max2}/D_{max}$, which can be indicated in audio signal level setting 252. As shown in chart 254, gradient $\Delta V_2/\Delta D$ is larger than gradient $\Delta V_1/\Delta D$, and controller 210 can configure transmitter circuit 208 to drive external speaker 216 with a higher level of analog voltage for the same digital signal level than transmitter circuit 108 driving microphone 102.

Based on digital signals 230 and audio signal level setting 252, transmitter circuit 208 can generate electrical signals 264, and drive external speaker 216 with electrical signals 264 to output egress audio signals 266. Transmitter circuit 208 can transmit electrical signals 264 via hardware interface 212, which in turn can transmit electrical signals 264 to external speaker 216 via a wired/wireless connection 270. Moreover, while external speaker 216 outputs egress audio signals 266, microphone 102 can continue receiving ingress audio signals 120 and convert to electrical signals 122, which are then digitized by receiver circuit 104 into digital signals 124. Speaker management module 220 can select audio signal level setting 252 such that the echo signals components present in electrical signals 122/digital signals 124 generated by microphone 102 and receiver circuit 104, when external speaker 216 outputs the maximum audio signal power when driven by the maximum voltage $V_{max2}$ output by transmitter circuit 208, are below an echo signal power threshold to maintain a quality of the bi-direction audio communication session.

The arrangements in FIG. 2A-FIG. 2C can improve user experience. Specifically, as external speaker 216 is separated from bi-directional audio device 200 by a longer distance than speaker 106, the echo effect created by external speaker 216 is likely to be less than that of internal speaker 106. This allows the power level of external speaker 216 to be increased while maintaining the echo signals components to below the echo signal power threshold, which can improve the clarity of ingress audio signals 120 as received by second user 131 of second audio device 114. Meanwhile, by increasing the output power level of external speaker 216, the clarity of egress audio signals 266 as received by first user 121 can be improved as well. All these can improve the quality of the bi-directional audio communication as well as user experience.

Example Components of Speaker Management Module and Operations

Figure 3:
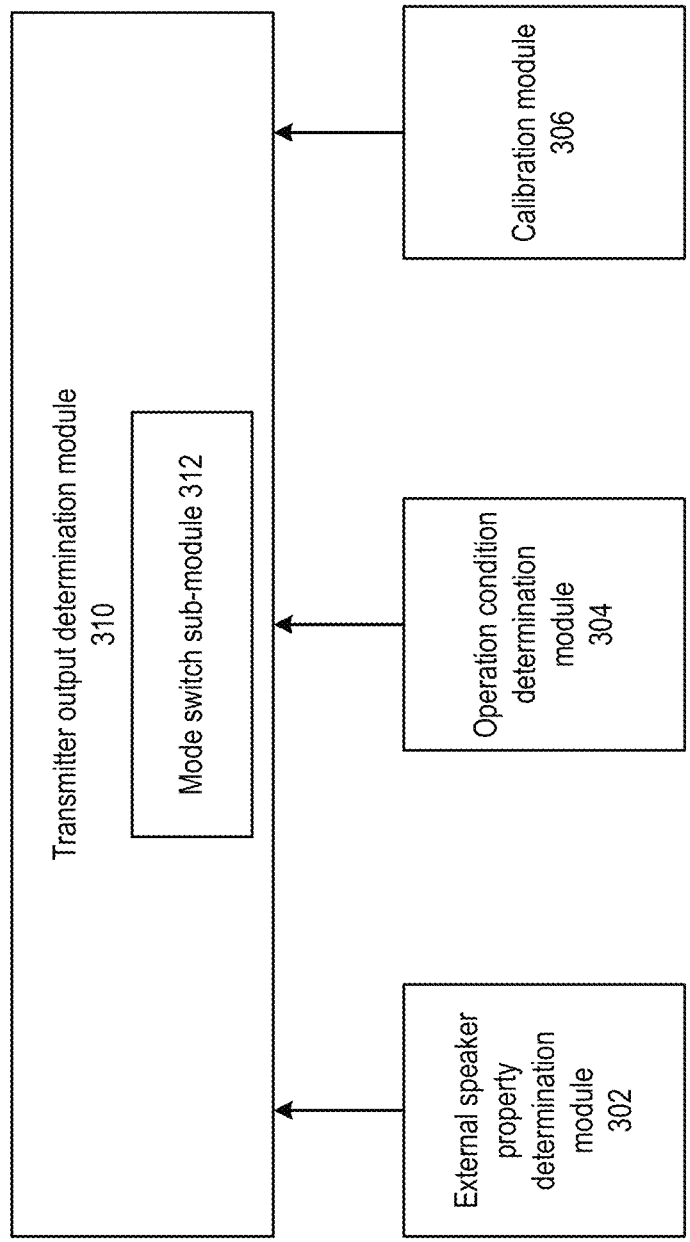
FIG. 3 illustrates examples of internal components of the bi-directional audio device of FIG. 2A-FIG. 2C, according to some embodiments.

FIG. 3 illustrates examples of internal components of speaker management module 220. As shown in FIG. 3, speaker management module 220 may include an external speaker property determination module 302, an operation condition determination 304, a calibration module 306, and a transmitter output determination module 310.

Transmitter output determination module 310 can include a mode switch sub-module 312 which can switch between a first mode of operation, in which speaker management module 220 operates speaker 106 when no external speaker is connected to hardware interface 212, and a second mode of operation, in which speaker management module 220 operates external speaker 216 when external speaker 216 is connected to hardware interface 212. When operating in the first mode of operation, transmitter output determination module 310 can determine an audio signal level setting for transmitter circuit 108 and speaker 106 based on known properties of speaker 106 as well as the echo signal power threshold. When operating in the second mode of operation, transmitter output determination module 310 can determine an audio signal level setting for transmitter circuit 208 and external speaker 216 based on the outputs of, for example, external speaker property determination module 302, operation condition determination module 304, and/or calibration module 306.

Figure 4A:
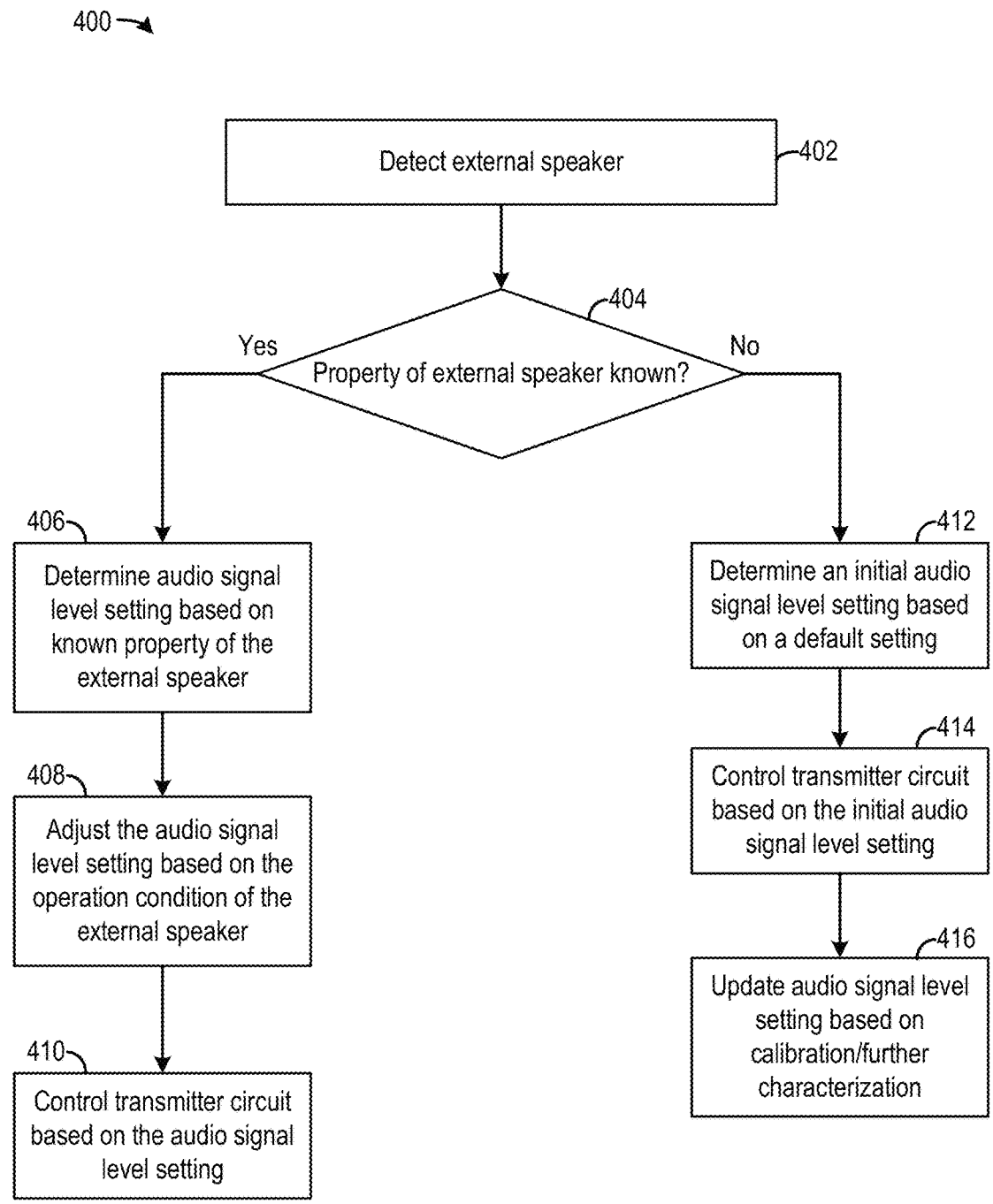
FIG. 4A, FIG. 4B, FIG. 4C, and FIG. 4D illustrate example techniques employed by the bi-directional audio device of FIG. 2A-FIG. 2C in controlling the output power of an external speaker, according to some embodiments.

FIG. 4A illustrates a flowchart 400 of an operation of transmitter output determination module 310 in conjunction with external speaker property determination module 302, operation condition determination module 304, and/or calibration module 306 in determining an audio signal level setting. Referring to FIG. 4A, after detecting that an external speaker (e.g., external speaker 216) is connected to hardware interface 212, in step 402, transmitter output determination module 310 can query external speaker property determination module 302 to determine whether the property of the external speaker is known, in step 404. As to be discussed below, a determination of whether the property of the external speaker is known can be based on whether microphone property determination module 302 stores various properties, such as electrical properties (e.g., a relationship between the driving voltage of transmitter circuit and the output power of the speaker) and operation properties (e.g., whether external speaker supports a beamforming operation, etc.) of the external speaker.

If the property of the external speaker is known (in step 404), transmitter output determination module 310 can determine an audio signal level setting based on the known property of the external speaker. For example, based on the relationship between the driving voltage of transmitter circuit and the output power of the external speaker (as perceived by microphone 102), as well as the echo signal power threshold, transmitter output determination module 310 can determine the maximum driving voltage of the transmitter circuit (e.g., $V_{max2}$ of FIG. 2C), and determine the gradient between digital signal level and analog voltage level based on the maximum driving voltage as part of the audio signal level setting.

Moreover, in step 408, transmitter output determination module 310 may operate with operation condition determination module 304 to determine an operation condition of the external speaker. The operation condition may include, for example, a location of the external speaker with respect to bi-directional audio device 200, a sound reflection property of the environment in which bi-directional audio device 200 and the external speaker are located, etc. Based on the operation condition, transmitter output determination module 310 can adjust the audio signal level setting.

In step 410, transmitter output determination module 310 can transmit the audio signal level setting, as well as digital signals representing the egress audio signals, to transmitter circuit 208 to drive external speaker 216 to output egress audio signals at an increased power level, in step 408.

On the other hand, if the property of the external speaker is not known (in step 404), transmitter output determination module 310 can determine an initial audio signal level setting based on a default setting. For example, transmitter output determination module 310 can determine an initial audio signal level setting based on increasing the audio signal level setting of speaker 106 by a default amount (e.g., 6 dB), in step 412. The default amount of increase in the power level can be based on, for example, an assumption that the external speaker is separated from the bi-directional audio device by at least a certain distance (e.g., one foot).

After determining the initial audio signal level setting, transmitter output determination module 310 can then transmit the initial audio signal level setting, as well as digital signals representing the egress audio signals, to transmitter circuit 208 to drive external speaker 216 to output egress audio signals at an increased power level, in step 414. In some examples, transmitter output determination module 310 can operate with calibration module 306 to characterize the echo signals power as well as the egress audio signals power, and may further adjust the audio signal level setting based on the characterization results, in step 416.

Figure 4B:
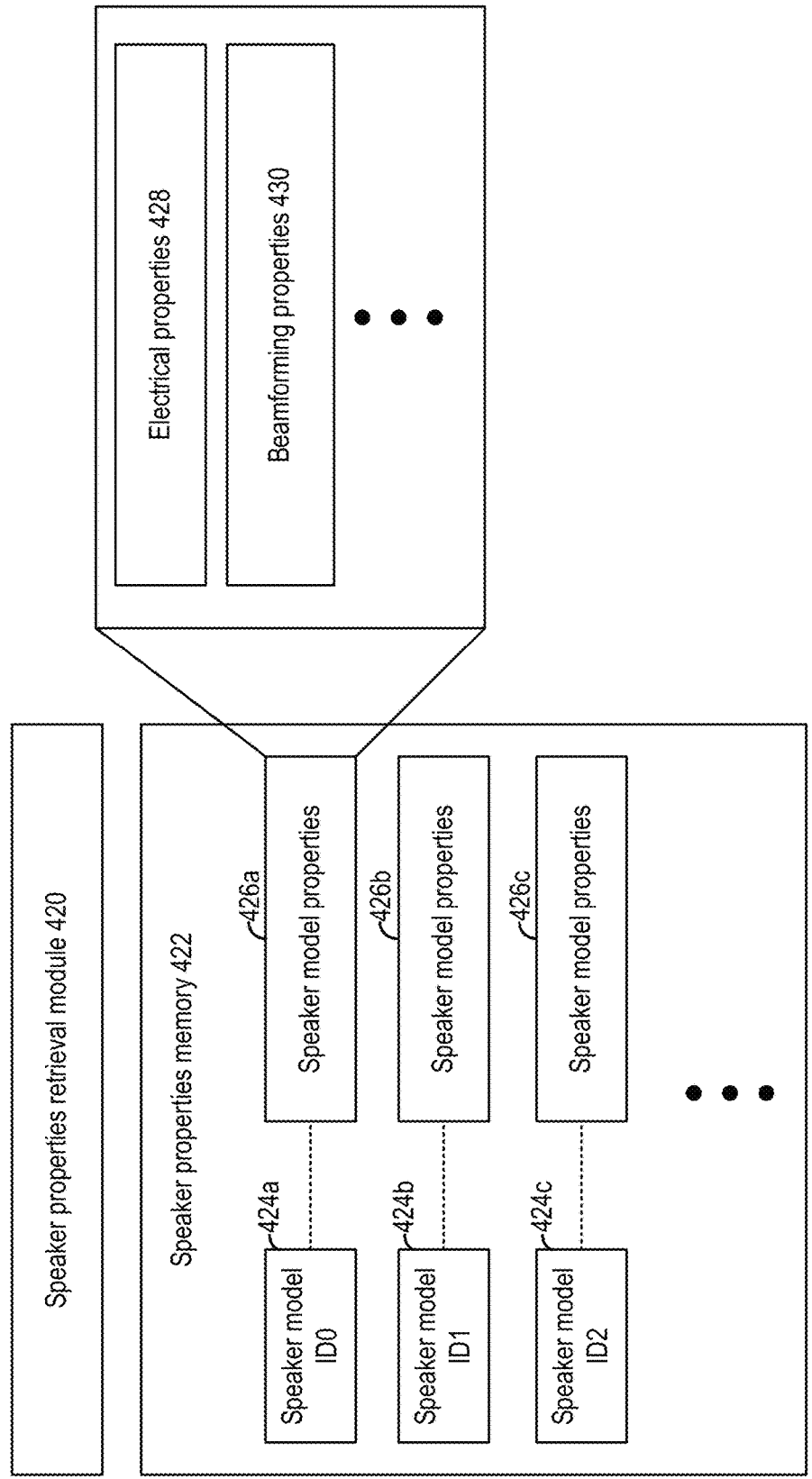

FIG. 4B illustrates examples of internal components of external speaker property determination module 302. As shown in FIG. 4B, external speaker property determination module 302 can include a speaker properties retrieval module 420 and a speaker properties memory 422. Speaker properties memory 422 can store a set of speaker model identifiers 424, each associated with a particular speaker model, such as speaker model identifier 424a (labelled "speaker model ID0"), speaker model identifier 424b (labelled "speaker model ID1"), speaker model identifier 424c (labelled "speaker model ID2"), etc. Speaker properties memory 422 further stores properties of the speaker model and the association between the properties and the speaker model identifiers. For example, speaker model properties 426a are associated with speaker model identifier 424a, speaker model properties 426b are associated with speaker model identifier 424b, whereas speaker model properties 426c are associated with speaker model identifier 424c.

Upon detecting that an external speaker is connected to hardware interface 212, transmitter output determination module 310 can determine the model of the external speaker, and provide the model information to external speaker property determination module 302. Speaker properties retrieval module 420 can then access properties memory 422 to search for a speaker model identifier that matches the model information of the external speaker property.

If a matching speaker model identifier is found, speaker properties retrieval module 420 can retrieve the speaker model properties 426 associated with the matching speaker model identifier 424, and provide the speaker model properties 426 back to external speaker property determination module 302. Referring back to FIG. 4A, this corresponds to the property of external speaker being known in step 404, and external speaker property determination module 302 can then perform steps 406 and 408 to determine the audio signal level setting based on the retrieved speaker model properties. On the other hand, if a matching speaker model identifier is not found, which corresponds to the property of external speaker being unknown in step 404, external speaker property determination module 302 can perform step 410 by determining the initial audio signal level setting based on a default setting.

Speaker model properties 426 can include various properties of a speaker model that enable transmitter output determination module 310 to determine the driving voltages to be output to an external speaker (e.g., external speaker 216) such that the power level of the echo signals component at the output of microphone 102 remains below the echo signal power threshold, while maximizing the power level of the audio signals output by the external speaker. For example, referring to FIG. 4B, speaker model properties 426a can include electrical properties 428 and beamforming properties 430.

Figure 4C:
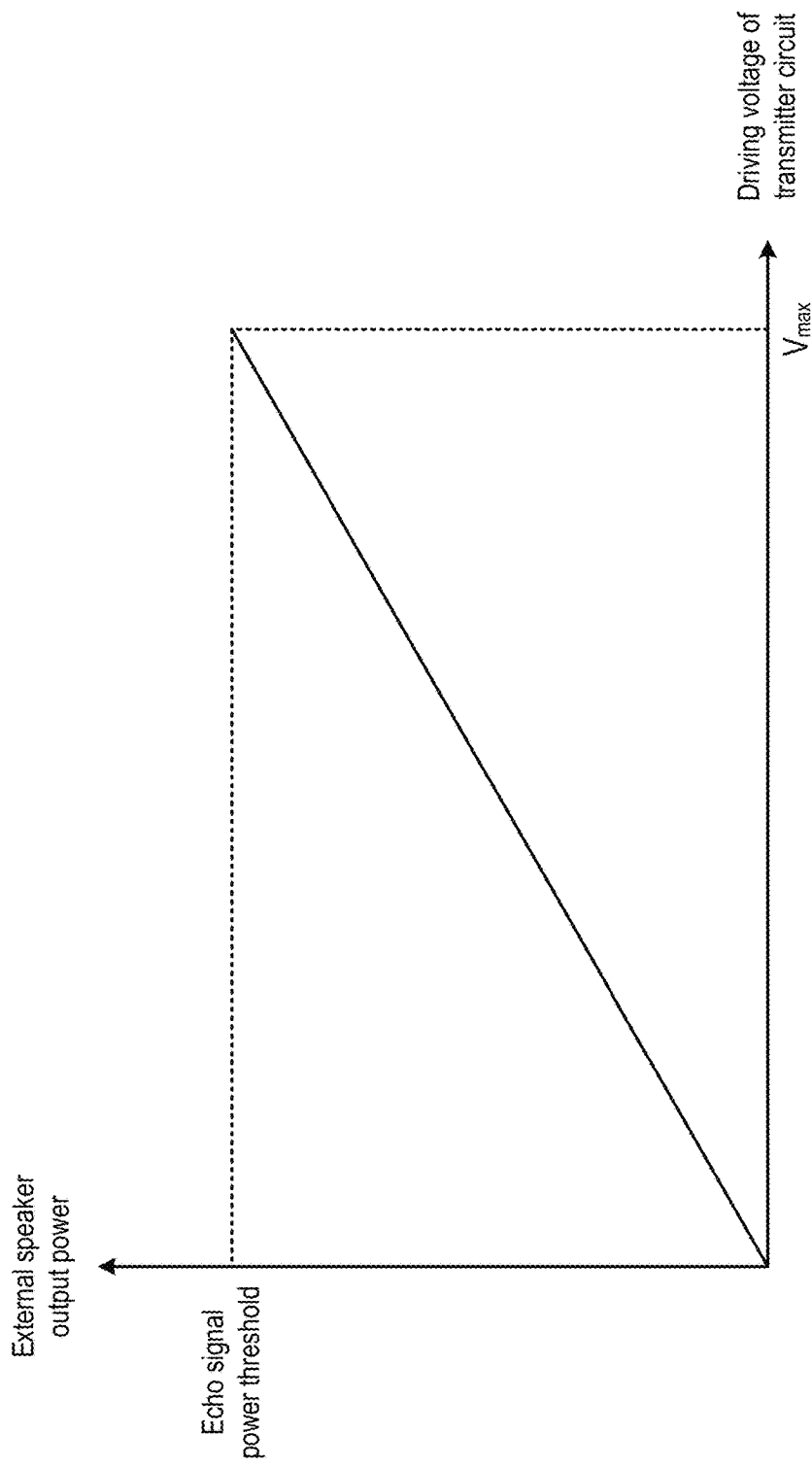

Electrical properties 428 can indicate a relationship between the driving voltage of transmitter circuit and the output power of the external speaker as perceived by microphone 102. FIG. 4C illustrates a chart 432 representing an example signal power ratio, which indicates a relationship between the driving voltage of transmitter circuit and the output power of a particular external speaker model. In some examples, the relationship can be a linear relationship, where the output power increases linearly with the driving voltage. The output power of the external speaker as perceived by microphone 102 can also be based on a distance between microphone 102 and the external speaker. In some examples, the output power of the external speaker as perceived by microphone 102 can be based on an assumption that microphone 102 is separated from the external speaker by a default distance (e.g., one foot or more), and based on an assumption that the audio signals output by the external speaker are omnidirectional.

Transmitter output determination module 310 can determine the driving voltages to be output by transmitter circuit 108 based on chart 432. For example, from chart 432, transmitter output determination module 310 can determine the maximum driving voltage ($v_{max}$ in FIG. 4C) such that the external speaker output power, as perceived by microphone 102, is below the echo signal power threshold. Transmitter output determination module 310 can then determine the gradient between the digital signal level and the analog voltage level based on the maximum driving voltage, such as $V_{max}/D_{max}$, as part of the audio signal level setting.

Figure 4D:
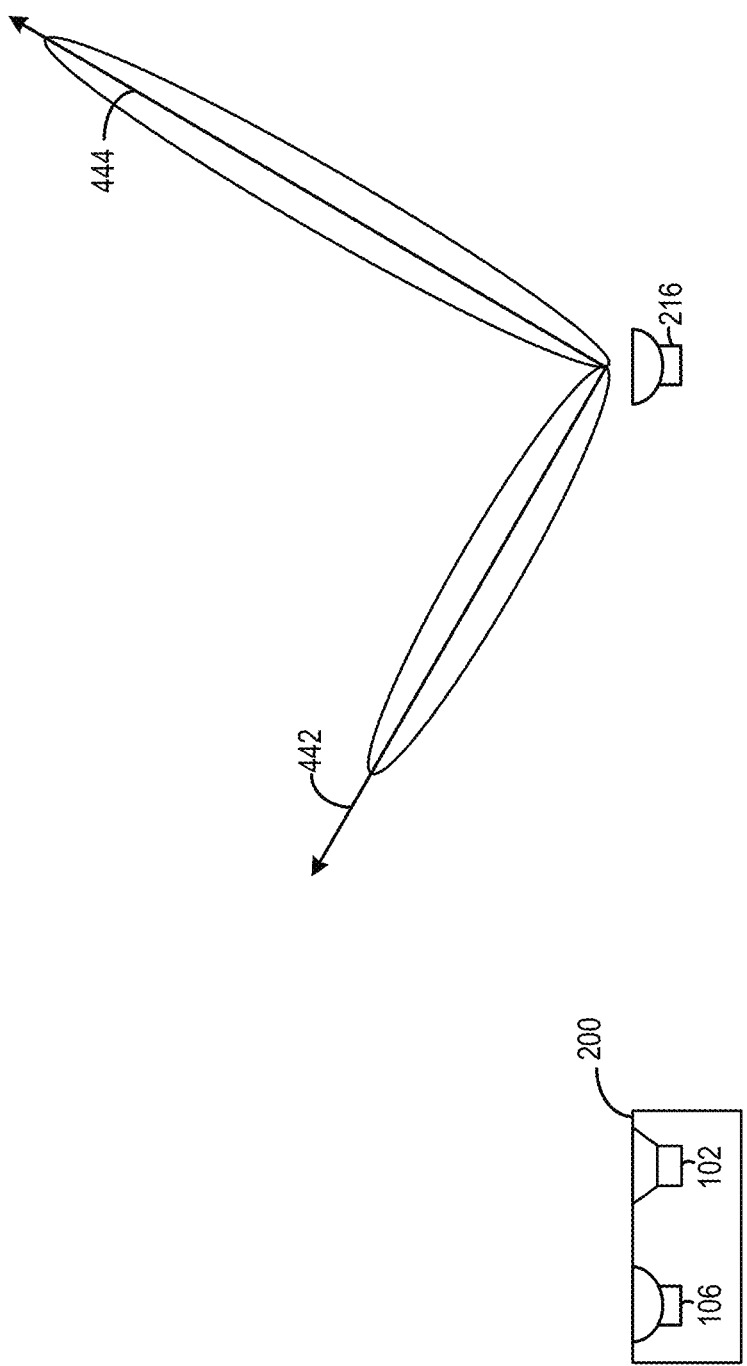

Besides electrical properties 428, transmitter output determination module 310 can determine the driving voltages to be output by transmitter circuit 108 based on beamforming properties 430 of external speaker 216. Beamforming properties 430 can generally refer to the capability of external speaker 216 in steering audio signals at a particular direction rather than transmitting omnidirectional audio signals. FIG. 4D illustrates the effect of beamforming properties 430 on the external speaker output power as perceived by microphone 102. As shown in FIG. 4D, external speaker 216 may steer audio signals 442 along a first direction towards microphone 102, or steer audio signals 444 along a second direction away from microphone 102. Microphone 102 may receive some of audio signals 442 and audio signals 444 due to, for example, reflection or direct propagation of the audio signals from external speaker 216 to microphone 102. But the power of audio signals 442, as perceived by microphone 102, may be higher than the power of audio signals 444, due to audio signals 442 travelling a longer distance than audio signals 442 prior to being received by microphone 102. Accordingly, based on the beam directions of audio signals 442 and 444 indicated in beamforming properties 430, transmitter output determination module 310 can determine audio signal level setting such that the output power of external speaker 216 is higher for audio signals 444 than for audio signals 442.

Referring back to FIG. 3 and FIG. 4A, transmitter output determination module 310 can operate with operation condition determination module 304 to determine an operation condition of bi-directional audio device 200 and external speaker 216, and adjust the audio signal level setting based on the operation condition. The operation condition may include, for example, a location of the external speaker with respect to bi-directional audio device 200, a sound reflection property of the environment in which bi-directional audio device 200 and the external speaker are located, etc.

Figure 5A:
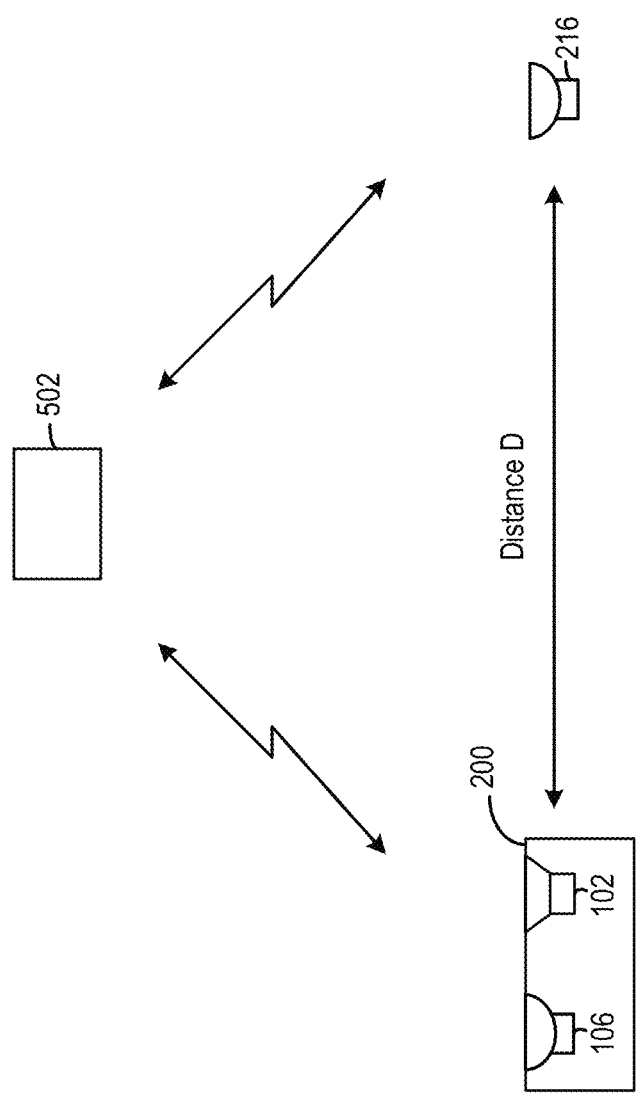
Figure 5B:
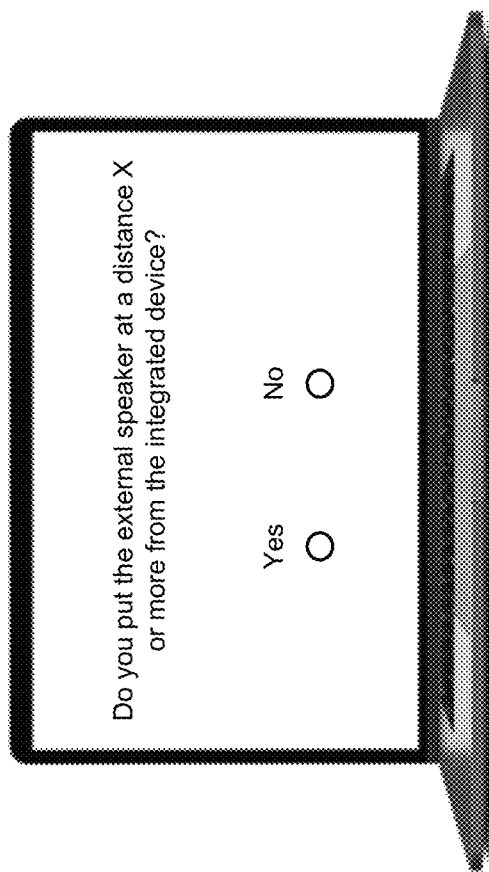

FIG. 5A, FIG. 5B, and FIG. 5C illustrate examples of operations by operation condition determination module 304. As shown in FIG. 5A, operation condition determination module 304 can determine a distance D between bi-directional audio device 200 and external speaker 216. Transmitter output determination module 310 can adjust the audio signal level setting based on the distance. For example, as the distance increases, the power of the audio signals output by external speaker 216 that reach microphone 102 decreases, and transmitter output determination module 310 can adjust the audio signal level setting to increase the power of the audio signals output by external speaker 216 while keeping the power level of the echo signals at the output of microphone 102 to be below the echo signal power threshold. On the other hand, as the distance decreases, transmitter output determination module 310 can adjust the audio signal level setting to reduce the power of the audio signals output by external speaker 216.

Operation condition determination module 304 can determine the distance between bi-directional audio device 200 and external speaker 216, using various techniques. For example, in a case where bi-directional audio device 200 and external speaker 216 are connected by a wired network (e.g., an audio cable), operation condition determination module 304 can measure an electrical resistance (e.g., based on measuring a current) across the wired network to determine the distance. As another example, in a case where bi-directional audio device 200 and external speaker 216 are connected by a wireless network, operation condition determination module 304 can transmit a ping signal to external speaker 216, which can then transmit the ping signal back to operation condition determination module 304, and operation condition determination module 304 can measure the distance based on the round-trip time of the ping signal. As another example, referring to FIG. 5B, operation condition determination module 304 can also receive inputs from the user about the distance and/or location of the external speaker, and determine the distance based on the user's input.

In addition, operation condition determination module 304 can determine the relative location of bi-directional audio device 200 with respect to external speaker 216. The relative location can be based on the distance, as well as the direction from bi-directional audio device 200 to external speaker 216 (or vice versa). In some examples, as shown in FIG. 5C, external speaker 216 may be installed on a ceiling, and the relative location can also include a vertical height between external speaker 216 and bi-directional audio device 200. Operation condition determination module 304 can combine the relative location information with other information, such as the beamforming direction of external speaker 216, to determine/adjust the audio signal level setting. For example, referring back to FIG. 4D, transmitter output determination module 310 can increase the power output of external speaker 216 for audio signals 444 and reduce the power output of external speaker 216 for audio signals 442 based on their beam directions as well as a determination that external speaker 216 is on the right of bi-directional audio device 200.

Operation condition determination module 304 can determine the relative location of bi-directional audio device 200 with respect to external speaker 216 using various techniques. For example, operation condition determination module 304 can receive user inputs about the locations of bi-directional audio device 200 and external speaker 216, and determine the relative location based on the user inputs. As another example, bi-directional audio device 200 and external speaker 216 can perform a ranging operation with a third device 502, such as a wireless access point, to determine a distance between third device 502 and each of bi-directional audio device 200 and external speaker 216. Combined with the distance between bi-directional audio device 200 and external speaker 216, the relative location of bi-directional audio device 200 with respect to external speaker 216 can be determined based on, for example, a triangulation operation.

Figure 5D:
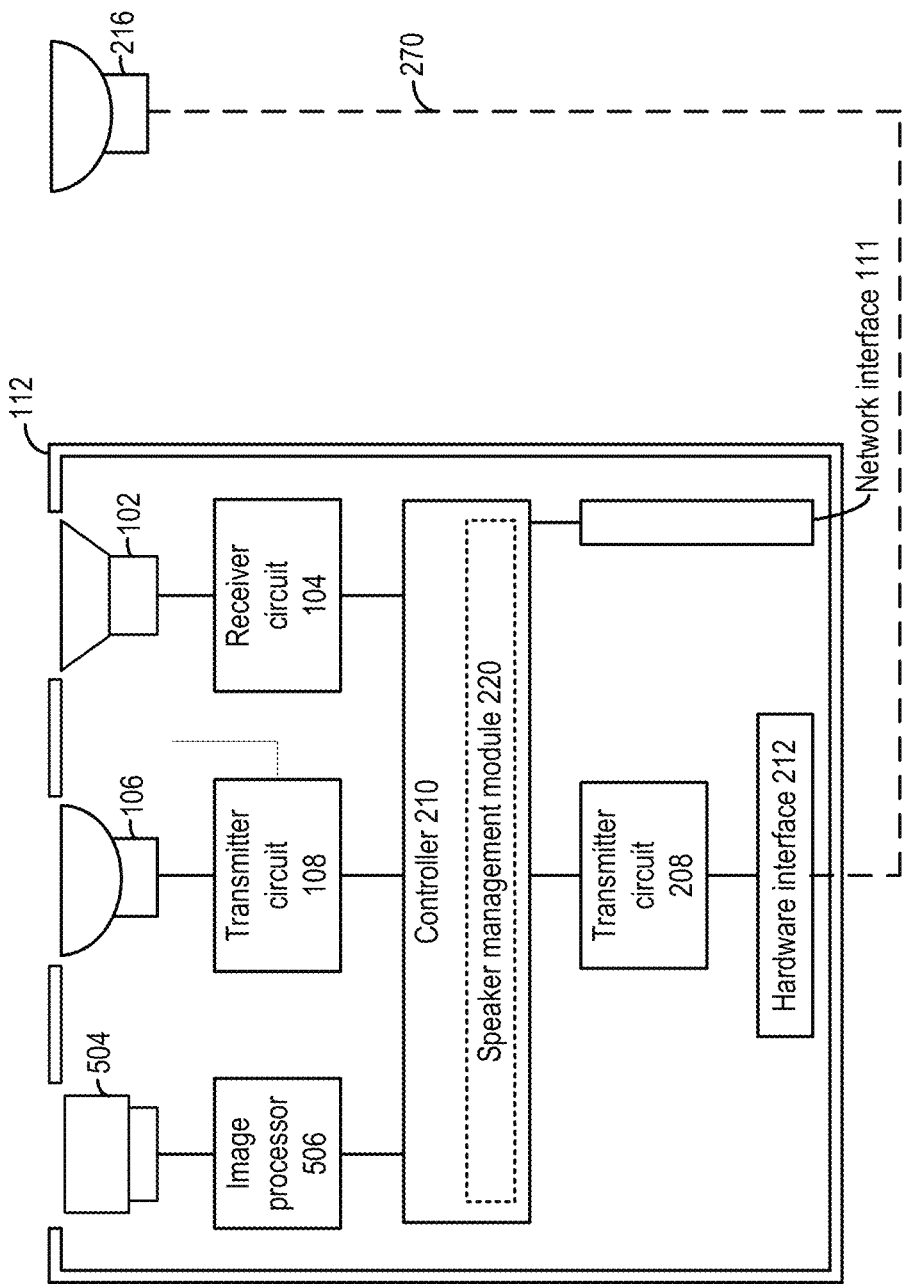

In some examples, operation condition determination module 304 may also determine the operation condition of bi-directional audio device 200 and external speaker 216 based on images taken for an environment in which bi-directional audio device 200 and external speaker 216 operate. In some examples, the images can be taken by external cameras of the video conferencing system. In some examples, as shown in FIG. 5D, bi-directional audio device 200 may include a camera 504 to capture the images and an image processor 506 to process the images.

Various information can be extracted from the images to determine the operation condition. For example, the images may indicate the relative location of first user 121 with respect to bi-directional audio device 200 and external speaker 216. Operation condition determination module 304 can extract the relative location information from the images. Based on the relative location information, transmitter output determination module 310 can determine a beam direction of external speaker 216 to direct the audio signals towards the direction of first user 121, and determine the audio signal level setting based on the beam direction as described above. In some examples, the images may reveal the reflective property of various structures in the operating environment of the bi-directional audio device (e.g., whether the walls are made of reflective materials or sound proof materials). Based on the reflective property revealed in the images, transmitter output determination module 310 can determine the audio signal level setting. For example, in an environment that comprises walls made of reflective materials, operation condition determination module 304 can reduce the power level of external speaker 216, whereas in an environment that comprises walls made of sound proof materials, transmitter output determination module 310 can increase the power level of external speaker 216.

Referring back to FIG. 4A, in a case where the property of the external speaker is not known, transmitter output determination module 310 may perform a calibration/characterization operation to determine the power of the echo signal component at the output of microphone 102, with the default audio signal level setting, and the adjust audio signal level setting based on the power of the echo signal component.

Figure 6:
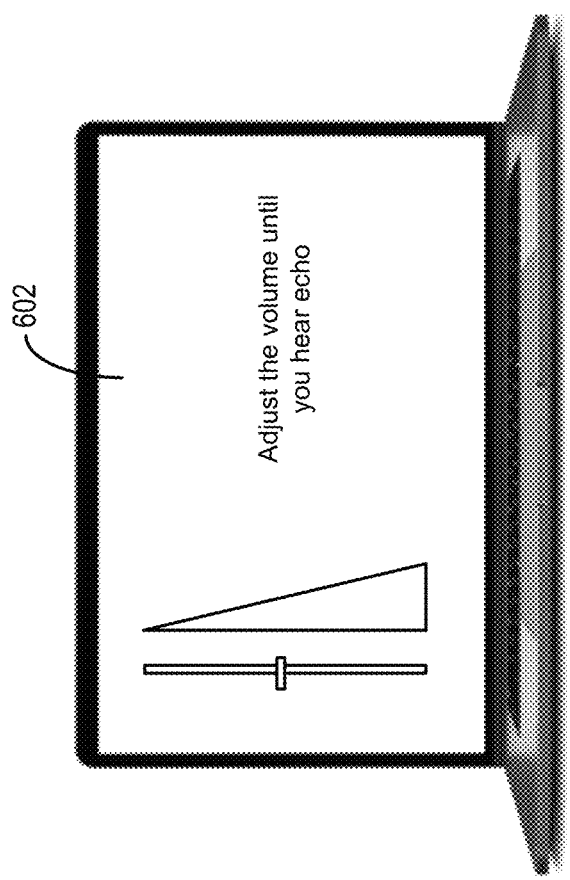
FIG. 6 illustrates example techniques employed by the bi-directional audio device of FIG. 2A-FIG. 2C in controlling the output power of an external speaker, according to some embodiments.

The calibration/characterization operation can be performed by calibration module 306. In some examples, as shown in FIG. 6, the calibration/characterization operation can be performed based on input from second user 131. Specifically, bi-directional audio device 200 may support a video conferencing application 602 that allows second user 131 to send a feedback to the first user about the echo perceived from the microphone outputs of bi-directional audio device 200. The feedback can be sent over network 116 to first user 121, or to the video conferencing application. The volume of the external speaker can then be adjusted manually by the first user and/or automatically by the video conferencing application.

As another example, the calibration/characterization operation can be based on a measurement of the power level of the echo signals component in the microphone outputs by calibration module 306. Specifically, calibration module 306 can identify the echo signal components in the microphone outputs based on identifying spectral components of the microphone outputs that experience power increases as a result of increasing the output power level of the external speaker, and determine the signal power of those spectral components to determine the power level of the echo signals component. Transmitter output determination module 310 can then adjust the audio signal level setting such that the power level of the echo signals component remains below the echo signal power threshold.

Method

Figure 7:
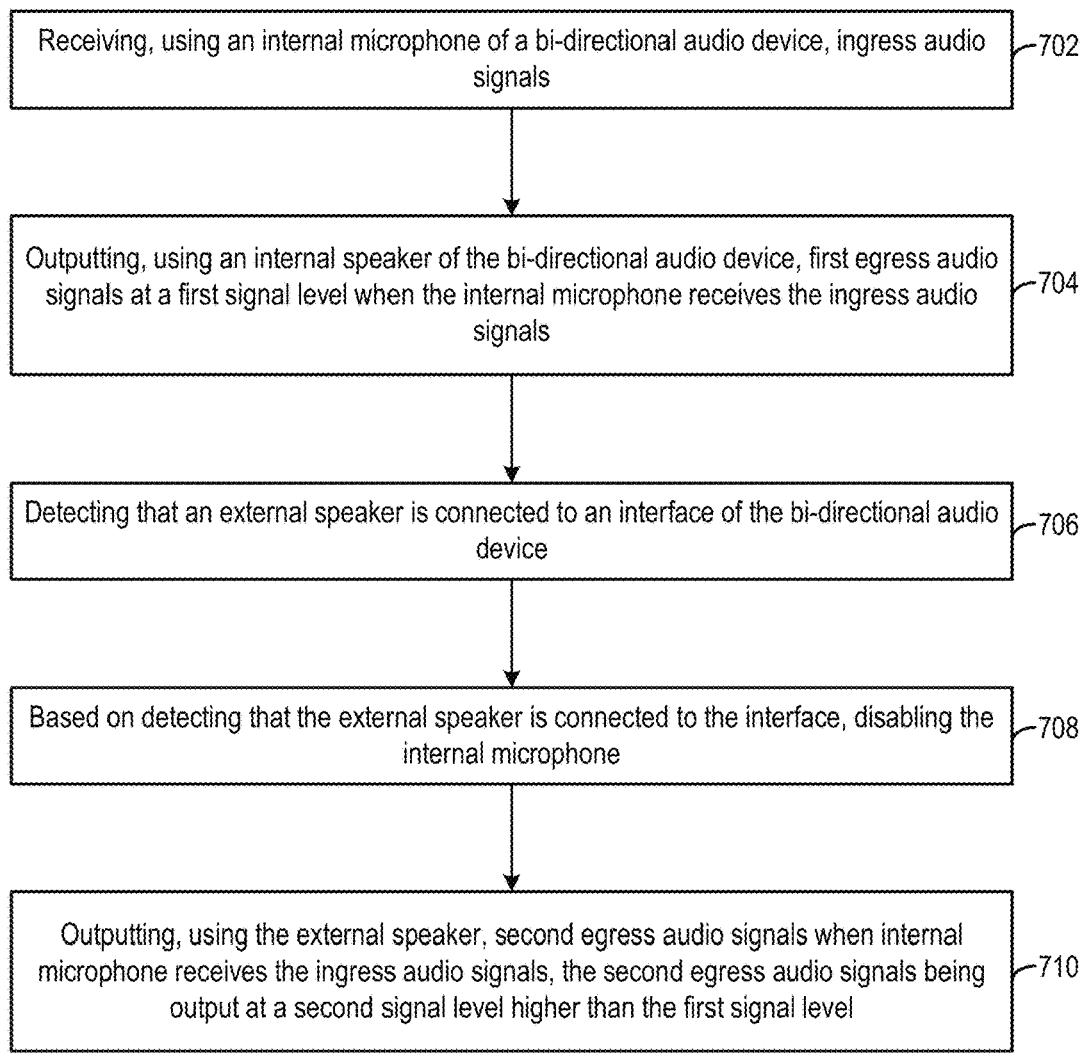
FIG. 7 illustrates examples of a method of operating a bi-directional audio device with an external speaker, according to some embodiments.

FIG. 7 illustrates a flowchart of a method 700 of operating a bi-directional audio device that is capable of connecting with an external speaker, such as bi-direction audio device 200 of FIG. 2A. Method 700 can be performed by a controller, such as controller 210 upon executing speaker management module 220.

In step 702, controller 210 can receive ingress audio signals using an internal microphone (e.g., internal microphone 102) of bi-directional audio device 200.

In step 704, controller 210 can output, using an internal speaker (e.g., internal speaker 106) of the bi-directional audio device, first egress audio signals at a first signal level when the internal microphone receives the ingress audio signals. The first signal level of the first egress audio signals can be set such that the power level of the echo signals component in the outputs of the internal microphone, caused by coupling of mechanical vibrations of the internal speaker, reflection of the first egress audio signals, etc., is below an echo signal power threshold, to maintain a quality of the bi-direction audio communication session.

In step 706, controller 210 can detect that an external speaker is connected to an interface (e.g., hardware interface 212) of the bi-directional audio device. Hardware interface 212 can include, for example, an audio jack, a wired/wireless network interface, etc., that is capable of connecting (via a wired/wireless connection) to an external speaker, such as external speaker 216 in FIG. 2C. The external speaker can be placed away from the housing of the bi-directional audio device by a certain distance (e.g., one foot or more).

In step 708, controller 210 can disable the internal speaker (or set its output volume to zero) based on detecting that the external speaker is connected to the interface. Moreover, in step 710, controller 210 can output, using the external speaker, second egress audio signals when the internal microphone receives the ingress audio signals, the second egress audio signals being output at a second signal level higher than the first signal level. Due to the increased separation between the external speaker and the internal microphone, the output power level of the external speaker can be increased to the second power level, while the power level of the echo signals component in the outputs of the internal microphone, caused by coupling of mechanical vibrations of the external speaker, reflection of the second egress audio signals, etc., remain below the threshold.

The controller can determine the second power level, and control the external speaker to output the second egress audio signals at the second power level, based on various techniques. For example, the controller can determine the second power level by increasing the first power level by a default amount (e.g., 6 dB). The default amount of increase in the power level can be based on, for example, an assumption that the external speaker is separated from the bi-directional audio device by at least a certain distance (e.g., one foot). Referring to FIG. 4B, the bi-directional audio device may also include a memory to store information of properties of different models of external speakers. The properties can indicate, for example, a signal power ratio between control signal and output power of the external speaker. In some examples, the properties may also indicate the external speaker has beamforming capabilities to steer an audio beam at a particular beam direction, which may reduce the power of the reflected second egress audio signals and allow the controller to further increase the second power level. The controller can determine the model of the external speaker connected to the interface, retrieve the properties (e.g., signal power ratio, beamforming properties, etc.) of the model, determine the control signal based on the properties, and transmit the control signal to the external speaker via the interface.

In some examples, referring to FIG. 4B, the controller may detect a model of an external speaker of which the properties information is not stored in the memory. In such a case, the controller can determine the second power level in a calibration operation. In a first stage of the calibration operation, the controller can increase the first power level by a default amount to the initial second power level. In a second stage of the calibration, the controller can obtain information about the echo signals component of the microphone outputs, and increase or decrease the second power level. The information about the echo signals can be obtained from, for example, the second user's feedback about the echo. Specifically, the bi-directional audio device may support a video conferencing application that allows the second user to send a feedback to the first user about the echo perceived from the microphone outputs of the bi-directional audio device. The feedback can be sent over the network to the first user, or to the video conferencing application. The volume of the external speaker can then be adjusted manually by the first user and/or automatically by video conferencing application.

As another example, the information about the echo signals can be obtained based on a measurement of the power level of the echo signals component in the microphone outputs by the controller. Specifically, the controller can identify the echo signal components in the microphone outputs based on identifying spectral components of the microphone outputs that experience power increases as a result of increasing the output power level of the speaker, and determine the signal power of those spectral components. The controller can then further increase the second power level if the power level of the echo signals remains below the echo signal power threshold, and increase the power level if the power level of the echo signals exceeds the echo signal power threshold. The controller may continuously monitor the power level of the echo signals and adjust the second power level during a bi-directional audio session, such as during a video conferencing session.

In some examples, the power level of the external speaker can also be determined based on an operation condition of the external speaker. Referring to FIG. 5A-FIG. 5D, the operation condition may include, for example, the actual distance between the external speaker and the bi-directional audio device, the relative location of the external speaker with respect to the bi-directional audio device, the reflective property of various structures in the operating environment of the bi-directional audio device, etc. The operation condition can be determined based on, for example, user input, on ranging operations, and/or from images of the operation environment.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus comprising:
    a housing;
    an internal speaker housed within the housing;
    an internal microphone housed within the housing;
    an interface; and
    a controller configured to:
        receive, using the internal microphone, ingress audio signals;
        output, using the internal speaker, first egress audio signals at a first power level when the internal microphone receives the ingress audio signals;
        detect that an external speaker is connected to the interface;
        based on detecting that the external speaker is connected to the interface, disable the internal microphone; and
        output, using the external speaker, second egress audio signals when the internal microphone receives the ingress audio signals, the second egress audio signals being output at a second power level higher than the first power level.

2. The apparatus of claim 1, wherein the external speaker is positioned at least one foot away from the apparatus.

3. The apparatus of claim 1, wherein the second power level is determined based on a model of the external speaker.

4. The apparatus of claim 3, further comprising a memory that stores a set of external speaker models and properties of each external speaker model;

wherein the controller is configured to:
determine a model of the external speaker;
retrieve, from the memory, the properties of the external speaker based on the model; and
determine the second power level based on the retrieved properties.

5. The apparatus of claim 4, wherein the retrieved properties include an electrical property of the external speaker.

6. The apparatus of claim 4, wherein the retrieved properties include a beamforming property of the external speaker.

7. The apparatus of claim 4, wherein the controller is configured to:
determine a distance between the apparatus and the external speaker; and
determine the second power level based on the distance and the retrieved properties.

8. The apparatus of claim 4, wherein the controller is configured to:
determine a relative location of the apparatus with respect to the external speaker; and
determine the second power level based on the relative location and the retrieved properties.

9. The apparatus of claim 4, wherein the controller is configured to:
obtain one or more images of an operation environment in which the apparatus and the external speaker are located;
determine an operation condition based on the one or more images; and
determine the second power level based on the operation condition.

10. The apparatus of claim 9, wherein the operation condition includes a relative location of a user of the apparatus with respect to the apparatus.

11. The apparatus of claim 9, wherein the operation condition indicates a reflectivity of audio signals in the operation environment.

12. The apparatus of claim 4, wherein the controller is configured to determine the second power level based on a default setting.

13. The apparatus of claim 12, wherein the controller is configured to determine the second power level based on the default setting based on determining that the properties of the external speaker are not stored in the memory.

14. An apparatus comprising:
a housing;
an internal speaker housed within the housing;
an internal microphone housed within the housing;
an interface; and
a controller configured to:
receive, using the internal microphone, ingress audio signals;
output, using the internal speaker, first egress audio signals at a first power level when the internal microphone receives the ingress audio signals;
detect that an external speaker is connected to the interface;
based on detecting that the external speaker is connected to the interface, disable the internal microphone; and
output, using the external speaker, second egress audio signals when the internal microphone receives the ingress audio signals, the second egress audio signals being output at a second power level higher than the first power level;
wherein the second signal power level is determined based on a model of the external speaker;
a memory that stores a set of external speaker models and properties of each external speaker model;
wherein the controller is further configured to:
determine a model of the external speaker;
retrieve, from the memory, the properties of the external speaker based on the model; and
determine the second power level based on the retrieved properties and a default setting;
perform a calibration operation to measure echo signal power at an output of the internal microphone when the external speaker outputs the second egress audio signals at the second power level; and
adjust the second power level based on a result of the calibration operation.

15. The apparatus of claim 14, wherein the measurement of the echo signal power is based on feedback from a user.

16. A method comprising:
receiving, using an internal microphone of a bi-directional audio device, ingress audio signals;
outputting, using an internal speaker of the bi-directional audio device, first egress audio signals at a first power level when the internal microphone receives the ingress audio signals;
detecting that an external speaker is connected to an interface of the bi-directional audio device;
based on detecting that the external speaker is connected to the interface, disabling the internal microphone; and
outputting, using the external speaker, second egress audio signals when the internal microphone receives the ingress audio signals, the second egress audio signals being output at a second power level higher than the first power level.

17. The method of claim 16, wherein the external speaker is positioned at least one foot away from the bi-directional audio device.

18. The method of claim 16, wherein the second power level is determined based on a model of the external speaker.

19. The method of claim 16, wherein the second power level is determined based on an operation condition of the external speaker.

20. The method of claim 16, wherein the second power level is determined based on a calibration operation.

* * * * *